Aug. 14, 1945.   G. M. NORMAN ET AL   2,382,574
CENTRIFUGAL
Filed Oct. 28, 1941   11 Sheets-Sheet 1

Inventors
GEORGE M. NORMAN
JOSEPH STUART II

Cleveland B. Hildebrand
Attorney

Aug. 14, 1945.    G. M. NORMAN ET AL    2,382,574
CENTRIFUGAL
Filed Oct. 28, 1941    11 Sheets-Sheet 3

Inventors
GEORGE M. NORMAN
JOSEPH STUART II

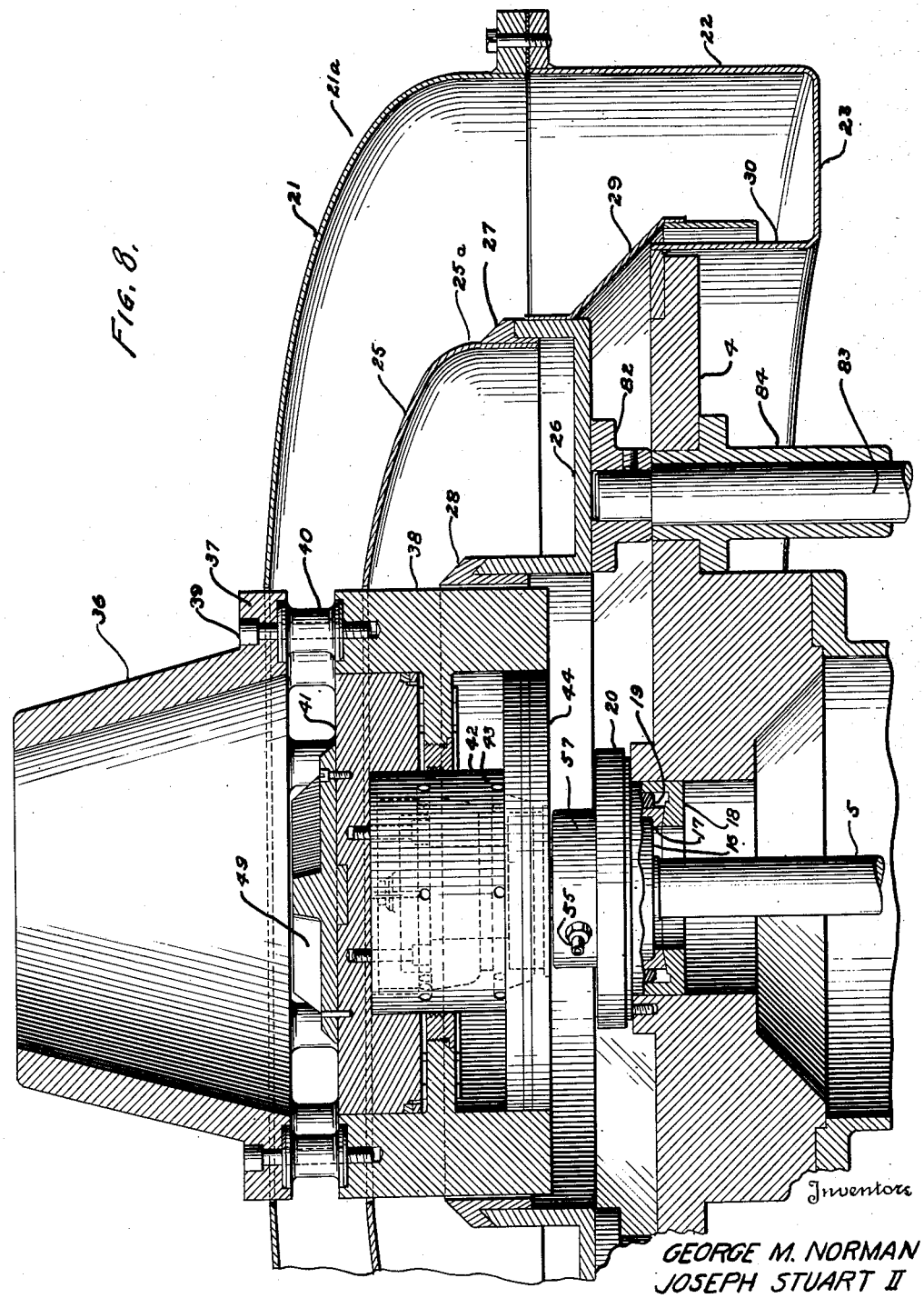

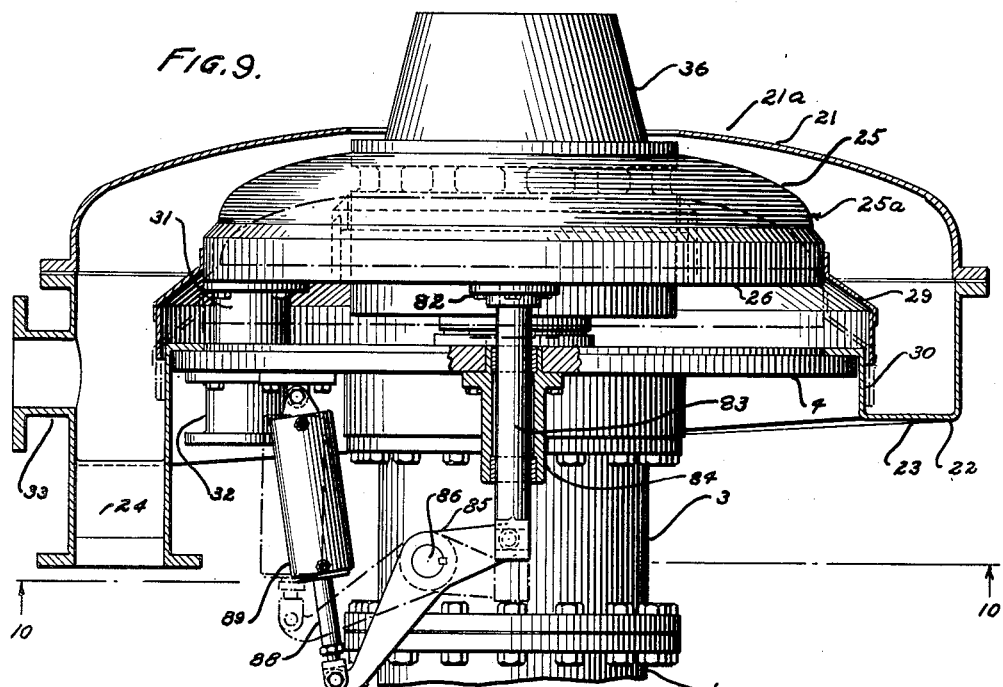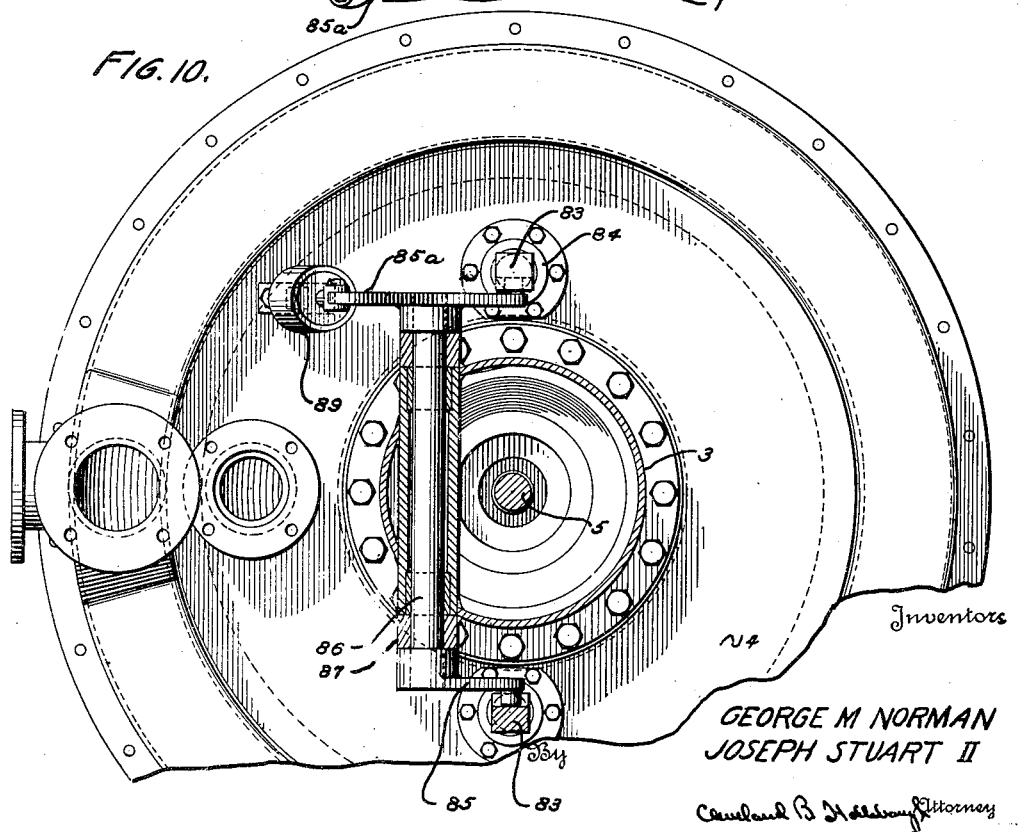

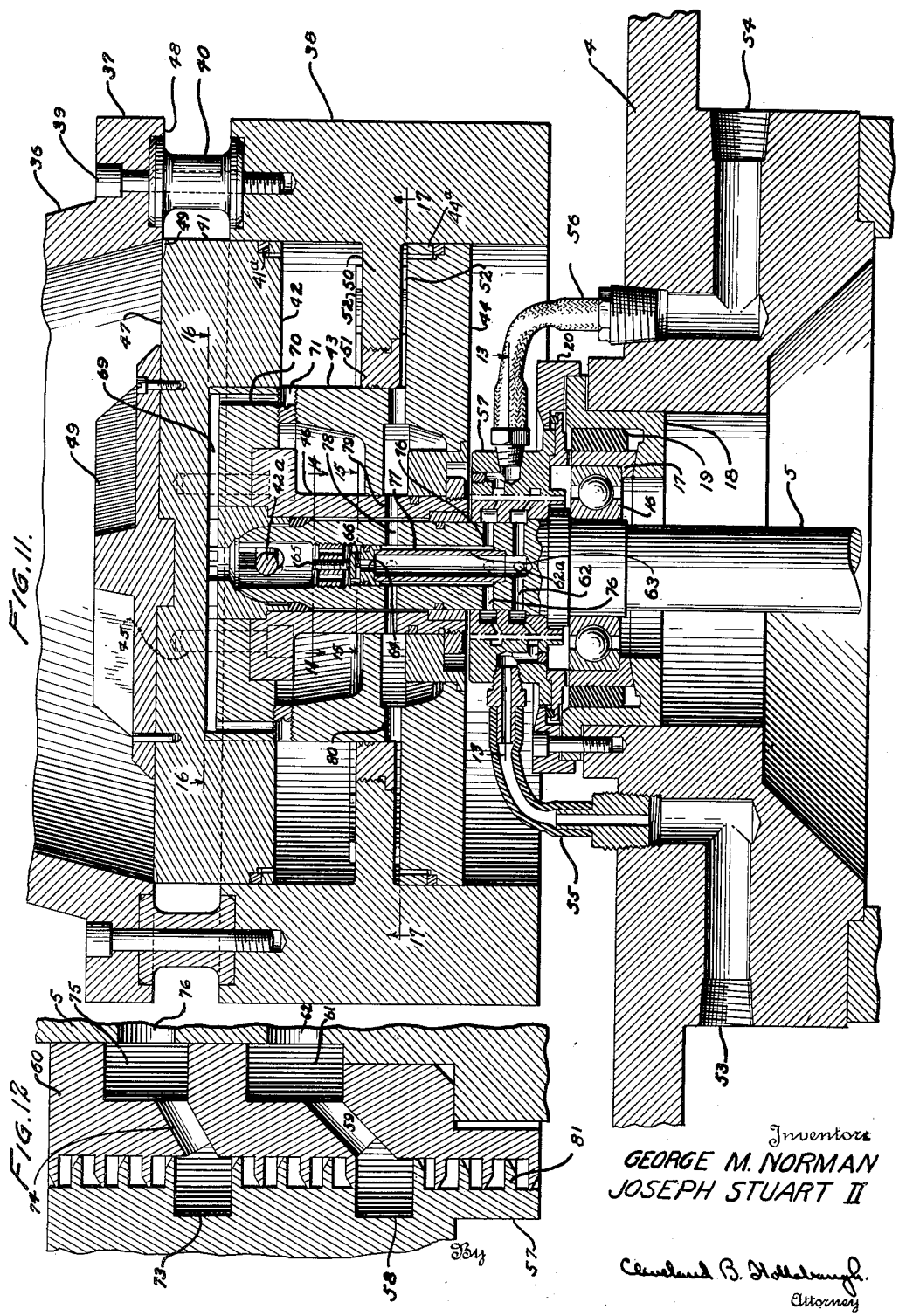

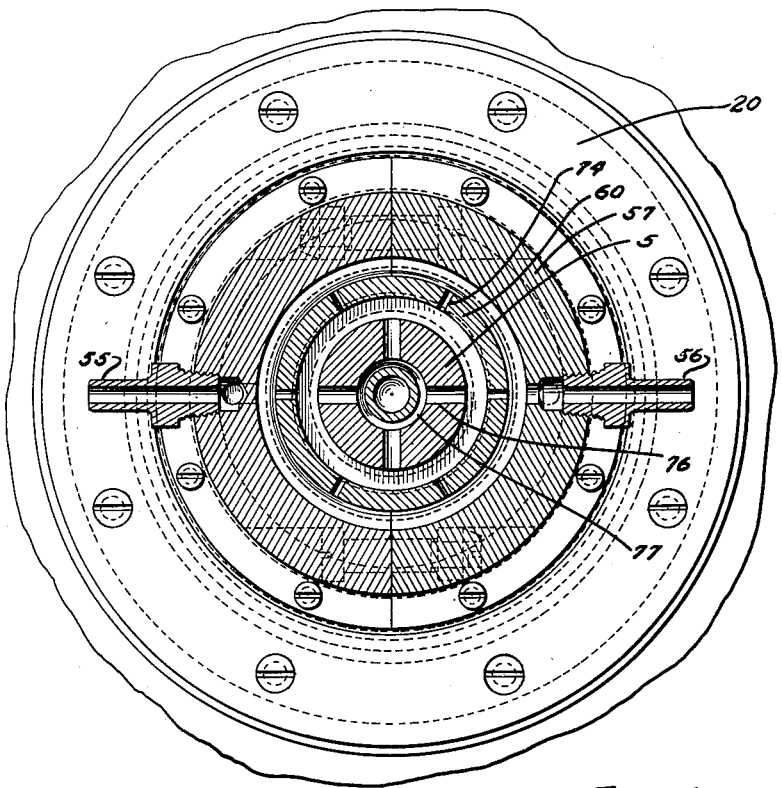
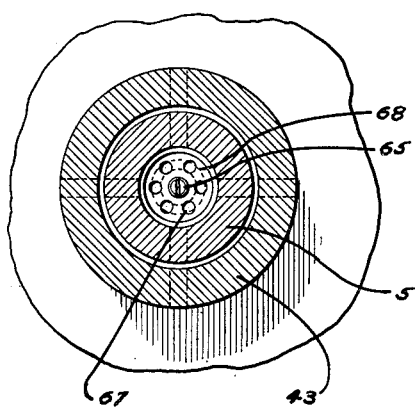
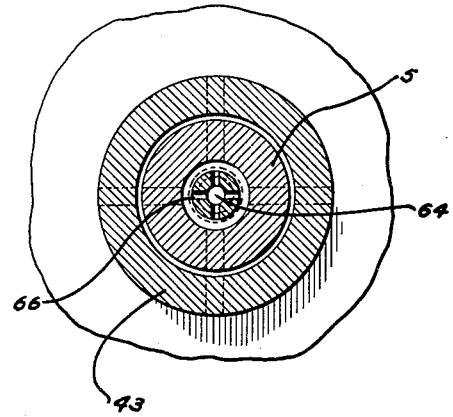

Aug. 14, 1945. G. M. NORMAN ET AL 2,382,574

CENTRIFUGAL

Filed Oct. 28, 1941

Inventors
GEORGE M. NORMAN
JOSEPH STUART II

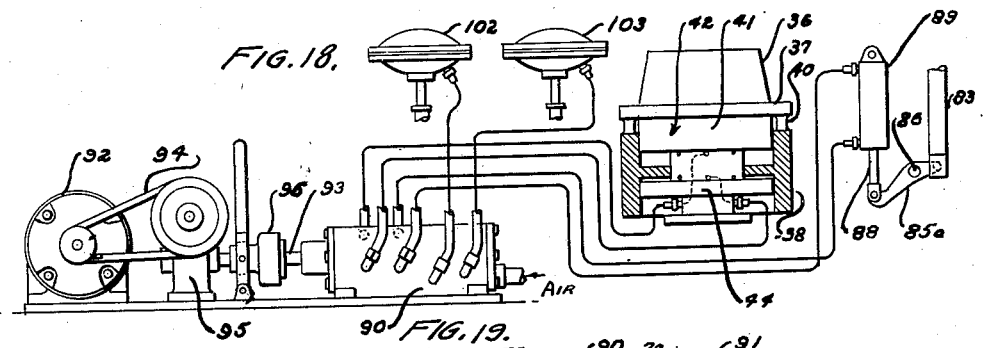
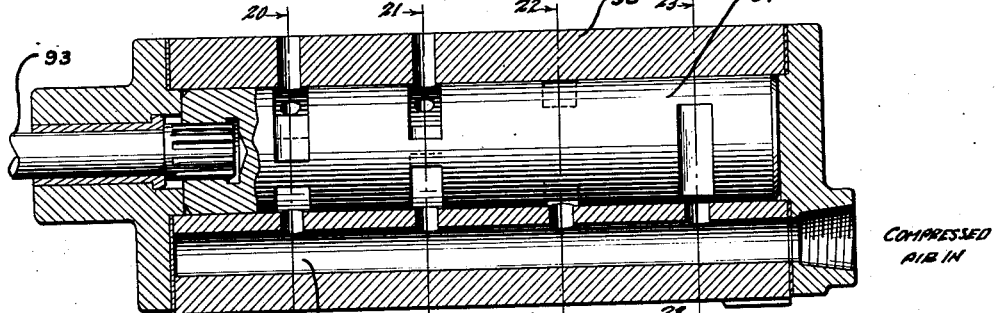
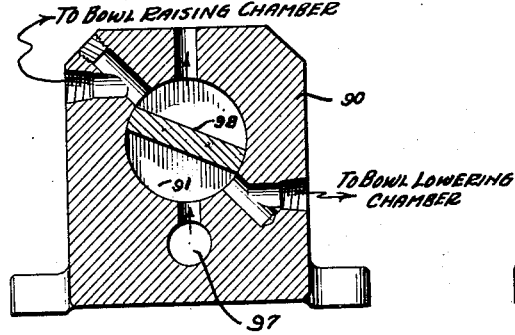
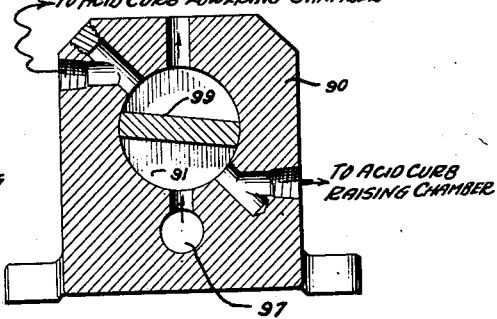
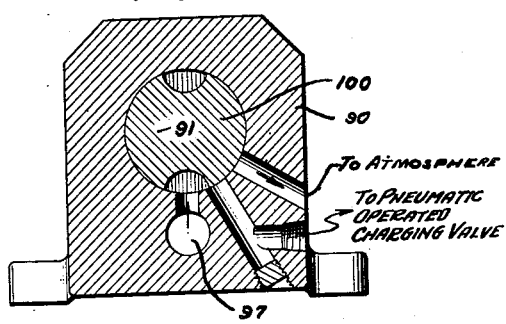
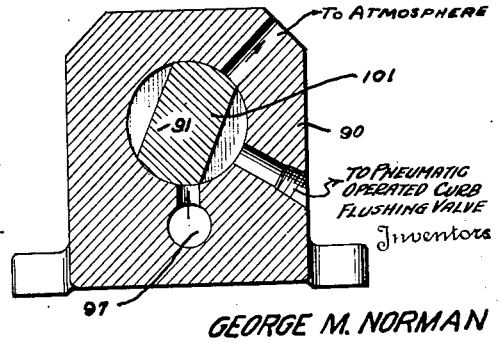

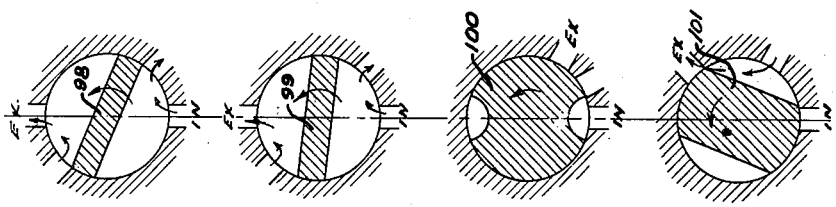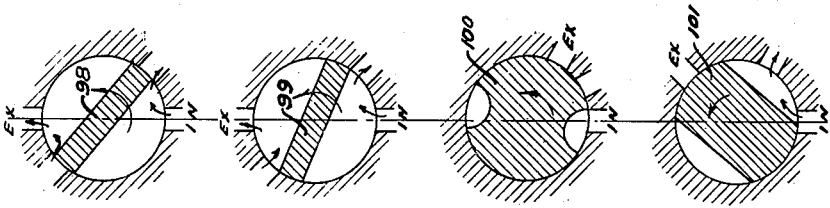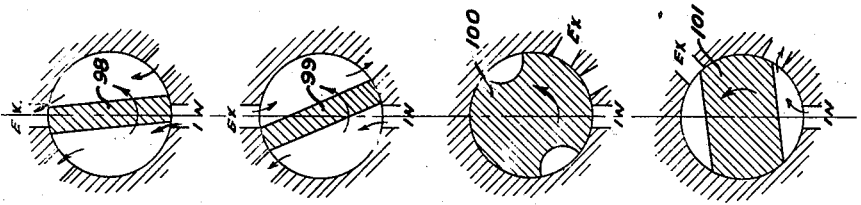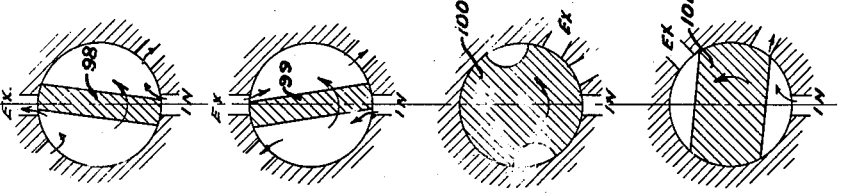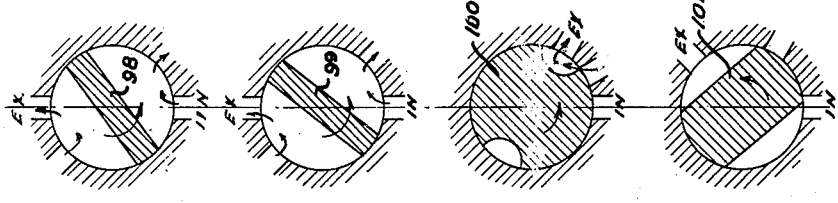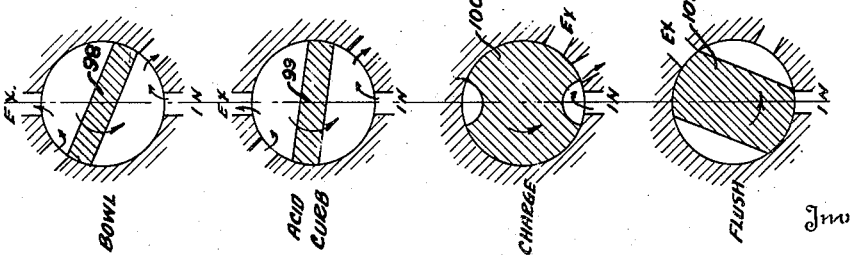

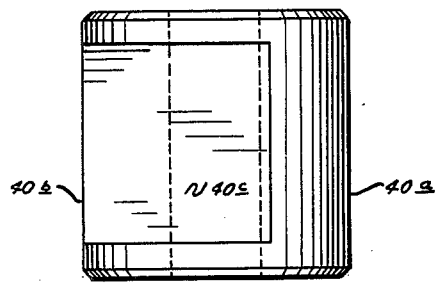
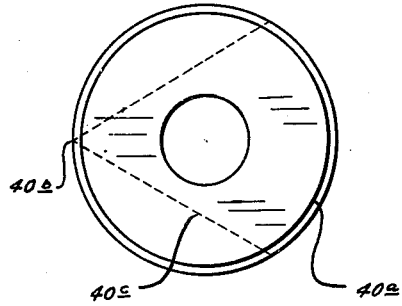
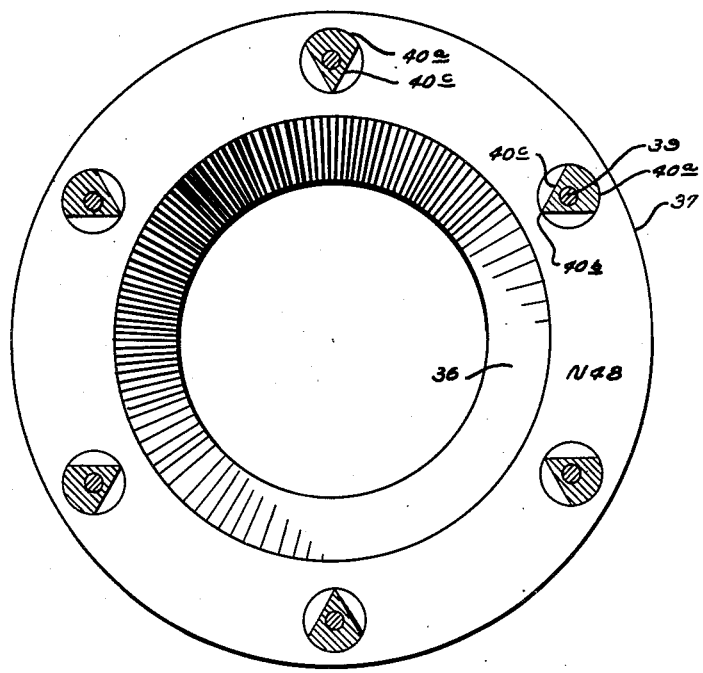

Patented Aug. 14, 1945

2,382,574

UNITED STATES PATENT OFFICE 2,382,574

CENTRIFUGAL

George M. Norman, Fairville, Pa., and Joseph Stuart, II, Wilmington, Del., assignors to Hercules Powder Company, Wilmington, Del., a corporation of Delaware Application October 28, 1941, Serial No. 416,850

5 Claims. (Cl. 210—73)

This invention relates to a machine and method for centrifugally removing liquids from solids and more particularly to a machine and method for centrifugally removing acid from nitrocellulose as, for example, nitrocellulose used in the manufacture of smokeless powder, plastics, protective coatings, etc., although it may be used for removing any suitable liquid from any suitable solid.

Conventional practice in the manufacture of nitrocellulose involves treating, for example, cotton with nitrating acid for a desired period of time by a batch process using a small batch at a time, thereupon opening the discharge valve of the nitrator, and rapidly discharging the entire charge into a centrifugal wringer. The wringer is then brought up to speed to remove the spent acid from the cotton. The spent acid is run by gravity from the outer jacket of the wringer to suitable recovery equipment. The wringer is stopped and the nitrocotton obtained is manually forked out through the bottom discharge of the wringer into a water immersion basin below. The labor and danger of manual handling and the delay incident to discontinuous operation are objectionable. Moreover, for safety, it is highly important that the nitrocotton be brought into contact with a large volume of water immediately after centrifugal removal of the acid. It is also necessary in existing practice to stop the centrifuge and fork out the nitrocotton, both steps requiring excessive time and causing too much delay for highest quality of product and safest working conditions.

The principal object of the present invention is to provide a centrifuge to be utilized as the aforementioned wringer but in which charging, removal of acid, discharging of separated acid, and discharging of the de-acidified nitrocellulose are effected automatically while the bowl of the centrifuge is continuously rotated. These steps eliminate the necessity for starting and stopping the machine, to effect unloading and reloading and furthermore, insure safety.

Another object of the invention is to provide an apparatus of this type in which the material being processed is discharged automatically at the proper time.

A further object is the provision of means for allowing oscillation or transverse vibration of the spindle and bowl without deleterious effects on the operation of the centrifuge.

Still another object is to provide an improved cellulose nitration process in which centrifuging is effectively and expeditiously performed.

Other objects of the invention will appear hereinafter, the novel features and combinations being set forth in the appended claims.

In the accompanying drawings wherein reference symbols refer to like parts wherever they occur, there is illustrated one form of apparatus for use in accordance with the present invention, and a modification thereto.

In the drawings:

Fig. 8 is an enlarged vertical section of the upper portion of the centrifuge showing the mechanism in solids discharge position.

Fig. 9 is a part elevation-part vertical section of the upper portion of the centrifuge showing the liquid discharge positioning means.

Fig. 10 is a section on the line 10—10 of Fig. 9.

Fig. 11 is an enlarged vertical section of the upper part of the centrifuge showing the mechanism for effecting liquid discharge or solids discharge.

Fig. 12 is an enlarged vertical section of the indicated portion of Fig. 11 showing details of the arrangement for obtaining fluid communication between bores in the rotating spindle and the non-rotating collar around it.

Fig. 13 is a section on the line 13—13 of Fig. 11.

Fig. 14 is a section on the line 14—14 of Fig. 11.

Fig. 15 is a section on the line 15—15 of Fig. 11.

Fig. 18 is a schematic view of the air piping connections and pneumatic control.

Fig. 19 is a sectional view through the master control valve.

Fig. 20 is a section on the line 20—20 of Fig. 19.

Fig. 21 is a section on the line 21—21 of Fig. 19.

Fig. 22 is a section on the line 22—22 of Fig. 19.

Fig. 23 is a section on the line 23—23 of Fig. 19.

Figs. 24 to 29 inclusive are schematic views showing various positions of the master control valve during cyclic operation of the apparatus. Specifically:

Fig. 24 shows the valve position at the beginning of charging;

Fig. 25 shows the valve position at the end of charging.

Fig. 26 shows the valve position as the liquid discharge mechanism starts to lower, the charging control being closed, and the flush control starting to open. The bowl is about ready to start to raise.

Fig. 27 shows the valve position as the bowl is starting to raise, the liquid discharge mechanism being down, and the flush control being open;

Fig. 28 shows the valve position as the bowl starts to lower, the liquid mechanism being up, the flush control still being open;

Fig. 29 shows the valve position at the start of the next cycle and is identical to Fig. 24.

Fig. 30 is an elevation of a modified form of spacing thimble for maintaining the discharge opening between the bowl and sleeve.

Fig. 31 is a plan view of the thimble of Fig. 30.

Fig. 32 is a horizontal section looking upwardly, taken through the thimbles between the bowl and sleeve, said thimbles embodying the modified form.

General

In general the apparatus of the present invention embodies a casing, a vertical spindle arranged to allow oscillation of a bowl carried thereon, means including a slipping clutch for driving the spindle and thereby the bowl, which is conical and mounted on a sleeve with discharge openings between the bowl and sleeve, mechanism for raising and lowering the bowl and sleeve and thereby adjusting the effective size of the discharge openings for liquid and for positioning the discharge openings opposite a liquid curb which is likewise movable for rapid registration with the discharge openings, means formed in part by a casing cover and in part by the top of the liquid curb constituting a solids curb or receiver for receiving the solids, and automatic timing mechanism for pneumatically carrying out all of the steps of the operation continuously and without slowing down or stopping the centrifuge.

Spindle driving mechanism

Figure 1:
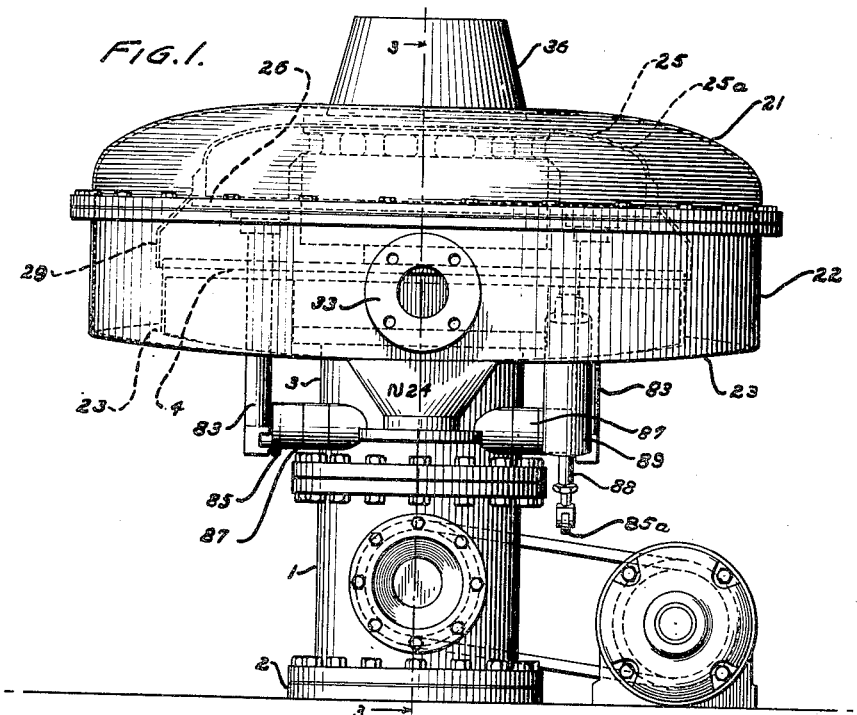
Fig. 1 is an elevation of the complete centrifuge.
Figure 2:
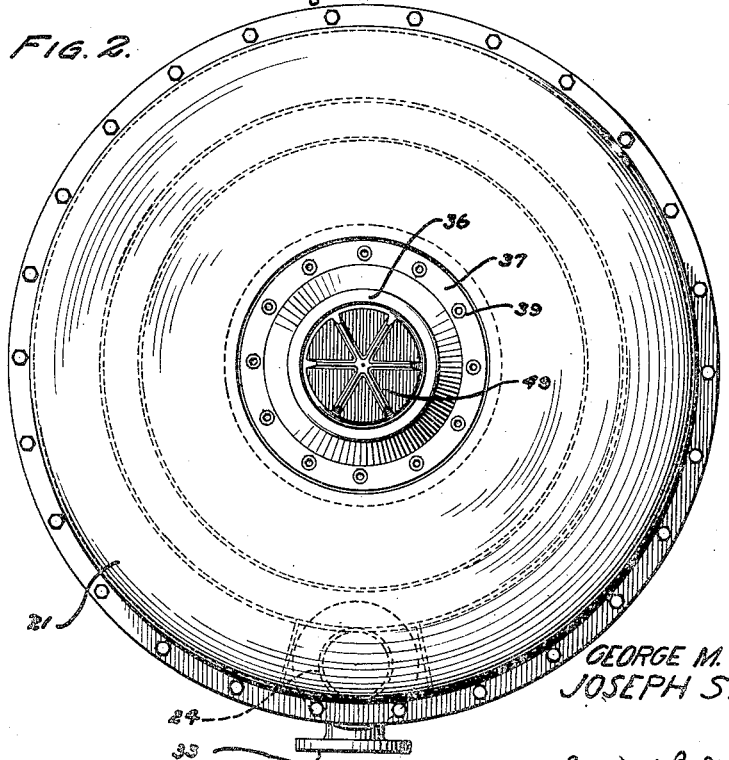
Fig. 2 is a plan of Fig. 1.
Figure 3:
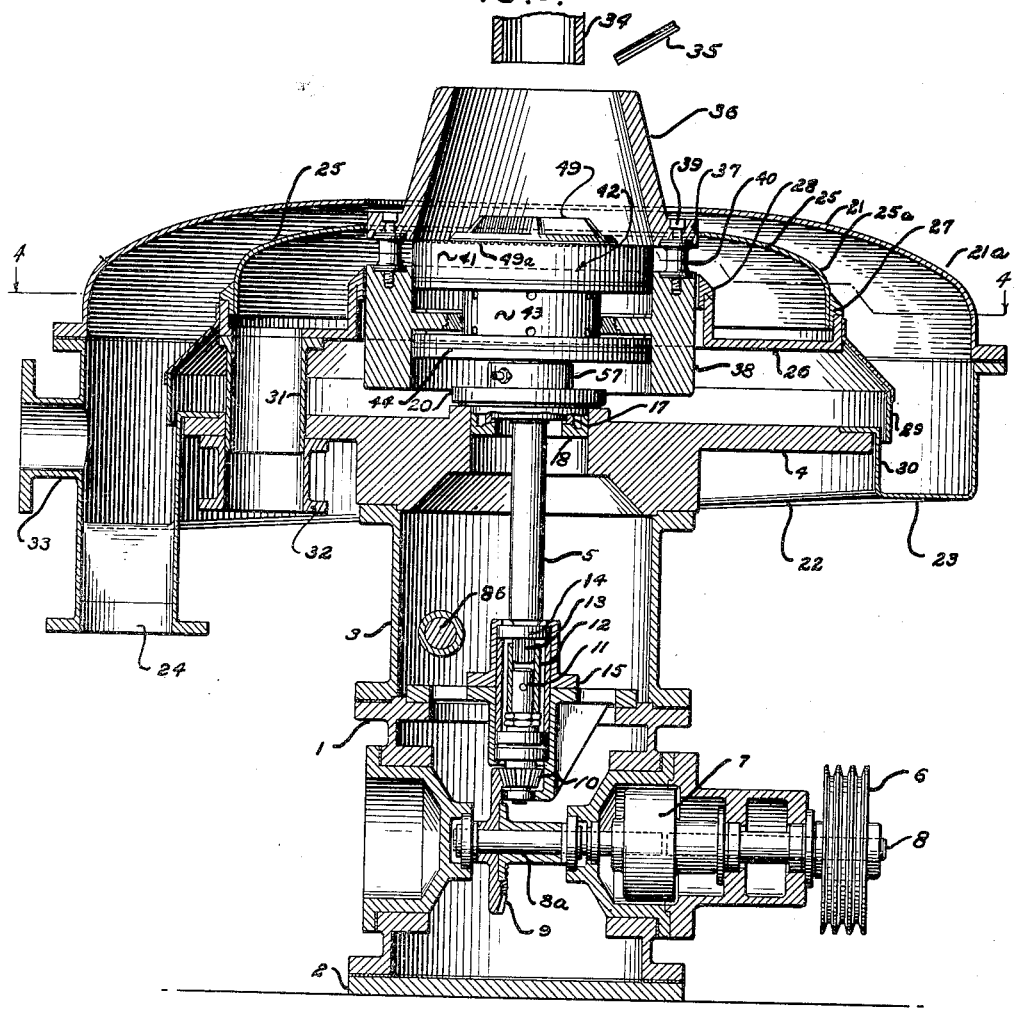
Fig. 3 is a section on the line 3—3 of Fig. 1, and shows the mechanism in liquid discharge position as well as general features of other appurtenant mechanism.
Figure 4:
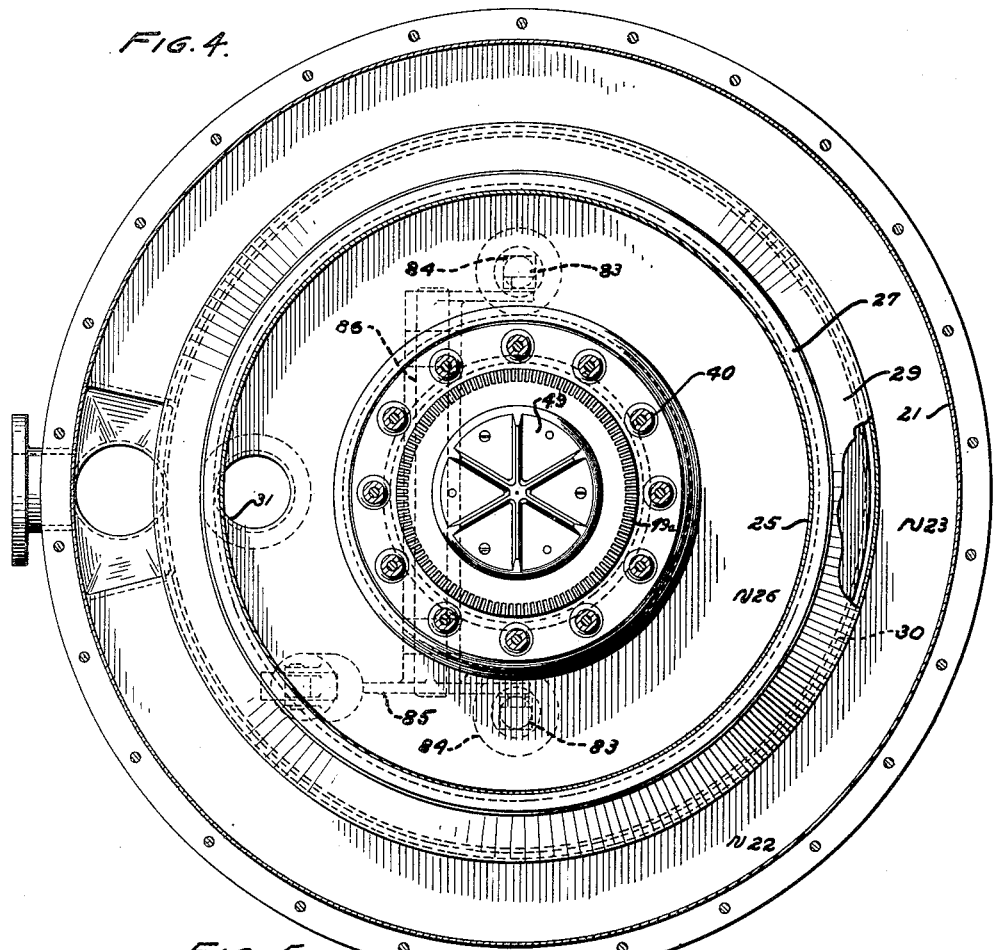
Fig. 4 is a section on the line 4—4 of Fig. 3.

In Figs. 1, 2 and 3, a casing member 1 is mounted on mounting plate 2 and has casing member 3 supported thereby, which in turn supports annular casting 4. A spindle 5 which drives a bowl, described hereinafter, is driven by means of pulley 6, slip clutch 7, transverse shafts 8 and 8a, gears 9 and 10, and vertical shaft 11.

In order to allow for transverse and/or progressive oscillation of the upper end of spindle 5, a universal connection is made between the lower end of spindle 5 and the upper end of shaft 11. This takes the form of an internally splined sleeve 12 keyed and pinned to shaft 11 and universally engaging splines 13 on the lower end of spindle 5. A self-aligning ball bearing 14 having its inner race fixedly mounted on spindle 5 rotatably engages stationary race of journal 15. Around spindle 5 adjacent its upper end is a ball bearing 16 (Fig. 11) fixedly carried in a bearing member 17 which has a concave spherical lower surface which spherically engages a cooperating spherical bearing surface on the upper face of a bearing member 18 which is rigidly mounted by cap ring 20 in support casting 4. Interposed between members 17 and 18 is a ring 19 of rubber or other suitable resilient material which tends to maintain member 17 centered. The radius of the spherical contact surface between members 17 and 18 is the distance to the effective center of the lower universal mounting of spindle 5. Thus, the upper end of spindle 5 is supported and guided by a floating bearing and spindle 5 may oscillate in a dampened condition without damage.

Solid and liquid collecting means

"Curbs" or "curbings" are provided for collecting the solid and the liquid. The top of the solids curb 21a (Figs. 8 and 9) is formed by the cover 21 mounted fixedly on a collecting shell 22 having an annular sloping bottom 23 leading to discharge opening 24. The interior side of the solids curb is formed by a curving member 25 which also forms the top of the movable liquid curb 25a.

The liquid curb 25a comprises top member 26, annular bottom member 26, ring 27 which rigidly interconnects 25 and 26, ring 28 which faces a sleeve to be described hereinafter, and skirt 29 which telescopically overhangs the inner face 30 of solids collecting shell 22. The liquid curb also fixedly carries an outlet pipe 31 which telescopically engages an outlet 32 mounted to casting 4.

Water for flushing the charge of solids as it leaves the solids curb 21a is introduced by way of inlet 33 or may be tangentially introduced at any desirable point.

The solid and liquid curbs are annular to accommodate the bowl 36 in a manner which will presently appear. The bowl 36 is charged by means of charging pipe 34 (Fig. 3) and is flushed by water introduced through pipe 35 (Fig. 3) mounted at an angle for thorough and rapid flushing.

Bowl and sleeve construction

In Figs. 3 and 11, the bowl 36 projects upwardly through the two curbs just described and comprises an upwardly and inwardly tapered wall integral with a flange 37 which is rigidly attached to rotatable cylindrical sleeve 38 by means of spaced bolts 39 passing through cylindrical spacers or thimbles 40. In Figs. 30, 31 and 32 an alternative embodiment utilizing a different type thimble 40a is shown. For certain processing this type thimble is preferred to the cylindrical type illustrated in the other figures. The thimble 40a has a generally triangular cross-section forming a leading edge 40b, the sides 40c being so designed that in a symmetric arrangement of thimbles the adjacent sides of adjacent thimbles are parallel thereby eliminating the danger of clogging due to converging the material being discharged. These thimbles provide a discharge opening between the bowl and the sleeve for the discharge of liquid or solids into their respective curbs.

The bowl 36 is bottomed by a spool-like member 42 having an upper flange 41, said spool 42 having a central cylindrical portion 43 and a bottom flange 44. A ring packing gland 41a and a ring packing gland 44a are provided in flanges 41 and 44, respectively, of the spool 42. The ring packing glands 41a and 44a are in slidable and frictional engagement with cylindrical sleeve 38. The frictional engagement of these glands with the sleeve 38 causes the sleeve to rotate with the spool 42. Accordingly, rotation is imparted to the bowl 36 by connection of elements 37, 39 and 40 which serve to connect the bowl to the sleeve as hereinbefore described. Spool 42 is supported on top of and pinned to spindle 5 by means of pin 42a. Upper flange 41 is detachably rigidly secured by bolts 45 to sleeve 46 which limits rocking motion of spool 42 about spindle 5 and to which is rigidly secured the central portion 43 of the spool-like member.

Upper flange 41 is of a thickness greater than that of lower flange 44 by the distance between the adjacent faces of flange 37 of bowl 36 and sleeve 38, so that when the bowl 36 and sleeve 38 are down the upper face 47 of flange 41 is on a level with the lower face 48 of bowl 36.

Fixedly mounted centrally of upper flange 41 which forms the bottom of bowl 36 is a vaned "spinner" 49 which prevents the material dumped into the bowl by way of pipe 34 from building up into an unbalanced condition.

Figure 5:
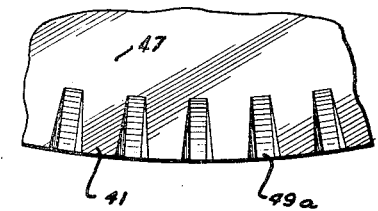
Fig. 5 is an enlarged plan of a portion of the edge of the bowl bottom showing the grooves which allow the liquid to flow off.
Figure 6:
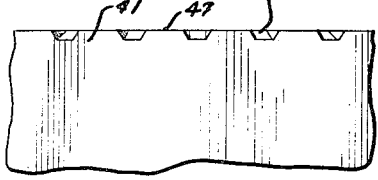
Fig. 6 is an elevation of the portion shown in Fig. 5.
Figure 7:
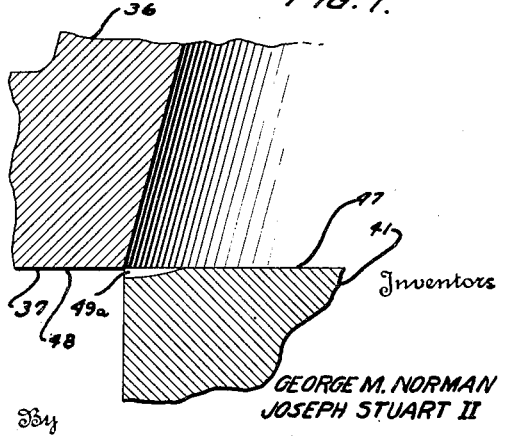
Fig. 7 is an enlarged vertical section showing details of the liquid channels when the mechanism is in liquid discharge position.
Figure 16:
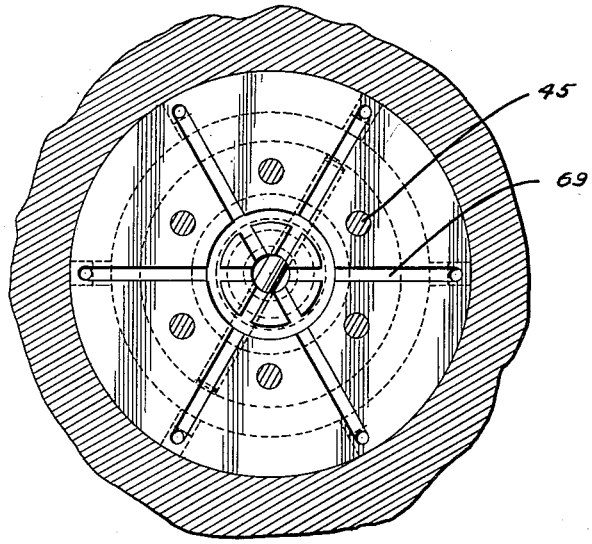
Fig. 16 is a section on the line 16—16 of Fig. 11.

To allow liquid to flow out from the bowl when the bowl and sleeve are down, radially disposed shallow grooves 49a (Figs. 5 to 7) are provided in the periphery of the upper face 47 of upper flange 41 of spool 42. These grooves are preferably not over 0.125″ in depth. As shown in Fig. 7, when the bowl and sleeve are down, these grooves form the only exit for liquid centrifuged out of the solids. The arrangement effectually prevents clogging of the discharge with solids during charging and centrifuging but allows ready discharge of liquid to the liquid curb 25a.

*Bowl positioning mechanism*

Fluid-operated means is provided for raising or lowering the bowl 36 and holding it in a raised or lowered position. Preferably, the operating fluid is compressed air which is preferred because of the almost instantaneous response as compared to the slow response when a liquid is used. Two operating compartments are formed between the flanges 41 and 44 (Figs. 11 and 12) of the spool-like member 42 by means of a piston flange 50 which is integral with sleeve 38. Flange 50 extends inwardly into frictional, sliding and sealing engagement with the central cylindrical portion 43 of the spool-like member 42, the actual contact being through surface of bearing 51. Flanges 41 and 44 likewise extend into frictional sliding and sealing relationship with the interior surface of sleeve 38, as provided by the ring packing glands 412 and 442, respectively.

Figure 17:
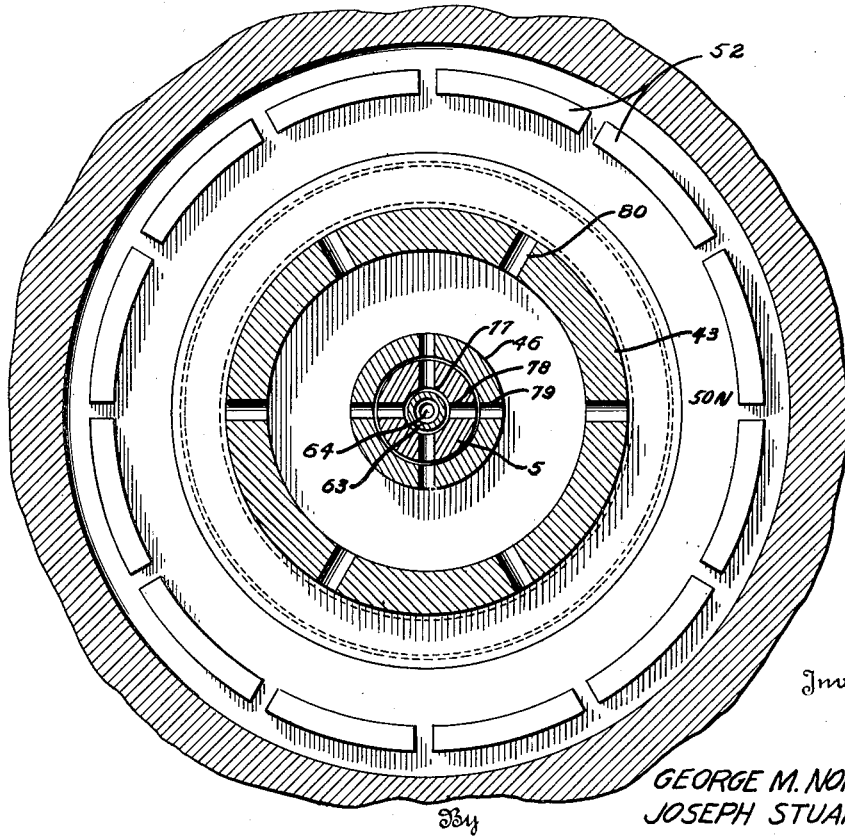
Fig. 17 is a section on the line 17—17 of Fig. 11.

To prevent flanges 41 and 44 from flush contact with the faces of piston flange 50, flange 50 is provided on either side with discontinuous projections 52 (Fig. 17). Thus, it is insured that the air admitted under pressure to either compartment is effective to push the piston flange 50 away from the bottom face of flange 41 or the top face of flange 44.

Operating air under pressure is admitted to or allowed to exhaust from either of the operating compartments by suitable passages connected to bores 53 and 54 in member 4, which lead by way of flexible conduits 55 and 56 respectively to connection with labyrinth sealing means (Fig. 12). Communication to the upper compartment is established by way of conduit 55 (Figs. 11 and 12), groove 58 in collar 57, bores 59 in rotating collar 60, groove 61 in collar 60, bores 62 and 62a in spindle 5, vertical pipe 63 mounted in spindle 5, through bores 64 and 66 adjustable by screw 65, then through vertical bores 67 in a member 68, then out the upper end of spindle 5 into horizontal passageways 69 downwardly through vertical bores 70 and horizontally through bores 71 into the upper compartment.

Communication between conduit 56 and the lower compartment is by way of groove 73 in collar 57, bore 74 and groove 75 in collar 60, bore 76, annular passageway 77 between pipe 63 and spindle 5, bores 78 in spindle 5, bores 79 in member 46, and bores 80 in member 43 leading into the lower compartment.

The escape of air between members 57 and 60 is minimized by means of the ribs 81 (Fig. 12) projecting alternately from members 57 and 60 into rotatable sealing engagement with the adjacent relatively movable surface.

*Liquid curb positioning mechanism*

In Figs. 3 and 8, the liquid curb 25a is supported on either side by means of a collar 82 fixedly attached to the lower side of bottom member 26. This collar is rigidly attached to a vertically slidable shaft 83 journalled in journal 84 which is mounted in member 4. The shafts 83 extend downwardly into operative engagement with cranks 85 and 85a (Figs. 1 and 9) which are fixedly mounted on transverse shaft 86. The transverse shaft 86 is journalled in housings 87 which are integral with casing member 3. Bell crank 85a is pivoted to a piston rod 88 of a double acting air cylinder 89 which is pivoted at its upper end to casing support member 4.

*Control mechanism*

In Figs. 18 and 19, control of bowl positioning, liquid curb positioning, charging and flushing is effected automatically by means of master control valve 90 which has a rotatable valve member 91 rotated by a motor 92 driving a shaft 93 at constant speed (preferably 2 R. P. M. in order to give a 15 second operating cycle). The motor 92 operates valve 90 through chain 94, reducing gear 95 and dog clutch 96.

Air under pressure is admitted to the bore 97 of master timing valve 90 whence it is directed in accordance with the angular position of valve member 91.

Valve member 91 has four individual controls: 98 (Fig. 20) which controls bowl positioning, 99 (Fig. 21) which controls acid curb positioning, 100 (Fig. 22) which controls charging of the bowl and 101 (Fig. 23) which controls flushing of the bowl. Control 100 admits air to pneumatically operated charging valve 102 (Fig. 18) which controls flow through charging pipe 34 (Fig. 3) into the bowl, while control 101 admits air to flushing valve 103 (Fig. 18) which controls flow of water or other flusing liquid through flushing pipe 35 (Fig. 3) to the bowl.

*Operation*

An example for operation of the invention is given for the removal of acid from nitrated cellulose. It will be assumed that the liquid curb 25a is up and the bowl 36 is down, the position of the valve member 91 being as is illustrated in Fig. 24, and that the bowl has attained a predetermined speed by allowing clutch 7 to slip until the bowl is up to the predetermined speed at which time slippage of the clutch ceases and drive is direct. The time controlled air valve 90 is started in operation and carries the apparatus through a 15 second cycle, a description of which follows with the position of valve member 91, indicated in the following figures by numerals 98, 99, 100 and 101 which represent bowl control, acid curb control, charge control, and flush control, respectively.

With the valve member 91 in the position shown in Fig. 24, the charging valve 102 is open to charge the rotating bowl 36 with a liquid-solid slurry of nitrated cellulose by pipe 34. The acid (liquid) is thrown outwardly by centrifugal force and flows out through grooves 49a through the discharge spaces between thimbles 40 into the acid (liquid) curb 25a, and thence leaves the machine by way of outlet 32.

After a suitable interval the control valve member 91 attains the position shown in Fig. 25, in which the bowl 36 and acid curb 25a are unchanged but the charging valve 102 is just beginning to close.

After the acid is completely separated from the nitrocellulose, the valve member 91 attains the position of Fig. 26, in which the charging valve 102 is closed, the acid curb 25a has started to lower and the flushing valve 103 has started to open, for subsequent flushing of the nitrocellulose into the solids curb 21a. The discharge opening from the bowl 36 to the acid curb 25a is now totally out of register.

When the valve member 91 attains the position shown in Fig. 27, the bowl 36 has started to raise so that the formerly restrained nitrocellulose now freely passes out through the discharge space into the solids curb 21a, the acid curb 25a is all the way down, and the flushing valve 103 is fully opened. Flushing is just about complete.

When the valve member 91 attains the position shown in Fig. 28, the bowl 36 has started to lower, the acid curb 25a has already been raised, and the flushing valve 103 is just beginning to be closed.

When the valve member 91 attains the position shown in Fig. 29, the bowl 36 is all the way down, the acid curb 25a is up, and the flushing valve 103 is closed and another cycle is initiated.

It is evident that there are numerous factors which will influence conditions for the most satisfactory operation of the invention, the actual limits of which cannot be established except by a detailed study of each set of materials to be processed.

By changing the control valving the sequence of steps in a cycle and the time for each step can be altered to accommodate a specific set of conditions.

Extremely rapid centrifuging is accomplished in the present invention due to the rapid change from liquid discharge to solids discharge and vice versa. The bowl and liquid curb move in opposite directions at approximately the same time thereby greatly accelerating the registration of the discharge opening with the liquid curb or solids curb.

The taper of the bowl and the arrangement of the bowl bottom cause the charge to exert a pronounced lifting effect on the bowl during centrifuging. This is a very desirable feature as automatic discharge of the contents is effected with clogging and compaction of the discharge openings substantially eliminated.

It will be seen, therefore, that this invention actually may be carried out by the use of various modifications and changes without departing from its spirit and scope.

What we claim and desire to protect by Letters Patent is:

1. In a machine for centrifuging material to separate liquid from solids, a spool-like member having an upper flange and a lower flange, and rigidly secured to a rotatable driving member; a cylindrical sleeve provided with a piston flange, said sleeve engaging the flanges of the spool, and the piston flange of the said sleeve engaging the spool between the spool flanges and spaced from said flanges thereby forming a sealed piston chamber for said piston flange; frictional engaging means between the spool-like member and the cylindrical sleeve to permit reciprocative vertical movement of said sleeve as actuated by its piston flange and to provide rotation of the sleeve with said spool-like member; a bowl for the material having an increased diameter at its bottom and rigidly secured to the cylindrical sleeve in spaced relationship thereto to provide discharge openings for said material, said bowl having its bottom formed by the upper flange of the spool-like member; a plurality of radially disposed shallow grooves provided at the periphery of the upper surface of the upper flange of the spool-like member; means for supplying fluid medium to the upper portion of the piston chamber to actuate the piston flange to a position adjacent the lower flange of the spool-like member whereby the bowl having its bottom formed by the upper flange of the spool-like member retains the solids and the liquid is discharged from the grooves in the upper flange through the discharge openings, and means for exhausting said fluid medium from the upper portion of the piston chamber; and means for supplying fluid medium to the lower portion of the piston chamber to actuate the piston flange to a position adjacent the upper flange of the spool-like member whereby the bowl having its bottom formed by the upper flange of the spool-like member releases the solids and the solids are discharged through the discharge openings, and means for exhausting said fluid medium from the lower portion of the piston chamber.

2. In the machine for centrifuging material to separate liquid from solids according to claim 1 wherein the upper surface of the upper flange of the spool-like member has rigidly secured thereto a plurality of radially disposed protrusions adapted to prevent the material within the bowl from building up into an unbalanced condition.

3. In the machine for centrifuging material to separate liquid from solids according to claim 1 wherein the bowl and the cylindrical sleeve are in spaced relationship, spacing means comprising a plurality of vertical members each having a sharp edge disposed towards the center of the bowl, and each member having each side thereof extending from the sharp edge parallel to an adjacent side of each of respective adjacent members.

4. In the machine for centrifuging material to separate liquid from solids according to claim 1 wherein the frictional engaging means between the spool-like member and the cylindrical sleeve comprises a ring packing gland secured to the upper flange of the spool-like member and a ring packing gland secured to the lower flange of the spool-like member.

5. In a machine for centrifuging material to separate liquid from solids, a spool-like member having an upper flange and a lower flange, and rigidly secured to a rotatable driving member; a cylindrical sleeve provided with a piston flange, said sleeve engaging the flanges of the spool, and the piston flange of the said sleeve engaging the spool between the spool flanges and spaced from said flanges thereby forming a sealed piston chamber for said piston flange; frictional engaging means between the spool-like member and the cylindrical sleeve to permit reciprocative vertical movement of said sleeve as actuated by its piston flange and to provide rotation of the sleeve with said spool-like member; a bowl for the material having an increased diameter at its bottom and rigidly secured to the cylindrical sleeve in spaced relationship thereto to provide discharge openings for said material, said bowl having its bottom formed by the upper flange of the spool-like member; a plurality of radially disposed shallow grooves provided at the periphery of the upper surface of the upper flange of the spool-like member; means for supplying fluid medium to the upper portion of the piston chamber to actuate the piston flange to a position adjacent the lower flange of the spool-like member whereby the bowl having its bottom formed by the upper flange of said spool-like member retains the solids and the liquid is discharged from the grooves in said upper flange through the discharge openings, and means for exhausting said fluid medium from the upper portion of the piston chamber; means for supplying fluid medium to the lower portion of the piston chamber to actuate the piston flange to a position adjacent the upper flange of the spool-like member whereby the bowl having its bottom formed by the upper flange of said spool-like member releases the solids and the solids are discharged through the discharge openings, and means for exhausting said fluid medium from the lower portion of the piston chamber; a stationary solids curb surrounding the discharge openings for receiving the solids and a vertically movable liquid curb disposed within the solids curb for receiving the liquid, said liquid curb adapted to be moved into communication with the discharge openings when the liquid is being discharged therefrom and out of communication with the discharge openings when the solids are being discharged therefrom, whereby the liquid and the solids are discharged into their respective curbs; means for egress of the liquid from the liquid curb; and means for egress of the solids away from the solids curb.

GEORGE M. NORMAN.
JOSEPH STUART, II.